United States Patent [19]

Turner

[11] 4,449,799
[45] May 22, 1984

[54] OPTICAL PROJECTION VIEWING SYSTEM

[76] Inventor: Roger S. Turner, 620 Carpenter La., Philadelphia, Pa. 19119

[21] Appl. No.: 380,107

[22] Filed: May 20, 1982

[51] Int. Cl.³ .......................................... G02B 21/36
[52] U.S. Cl. ...................................... 353/39; 353/79; 353/119
[58] Field of Search ................... 353/39, 79, 119, 77, 353/78, 99, 100, 98; 350/522, 507, 508, 531, 520; 356/391

[56] References Cited

U.S. PATENT DOCUMENTS

| | | | |
|---|---|---|---|
| 2,170,967 | 8/1939 | Eppenstein et al. | 353/39 |
| 2,304,921 | 12/1942 | Hopkins | 353/79 |
| 2,427,256 | 8/1947 | Butscher | 353/39 X |
| 2,950,650 | 8/1960 | Klein | 353/39 X |
| 3,597,093 | 8/1971 | Wolf | 356/391 |
| 3,789,140 | 1/1974 | McQueen et al. | 353/79 X |
| 4,099,831 | 7/1978 | Freeman | 350/508 |
| 4,135,778 | 1/1979 | Lincoln | 350/520 |
| 4,174,889 | 11/1979 | Peters | 353/78 X |

FOREIGN PATENT DOCUMENTS

| | | | |
|---|---|---|---|
| 535909 | 1/1957 | Canada | 353/39 |
| 676102 | 2/1930 | France | 353/79 |

Primary Examiner—Harry N. Haroian
Attorney, Agent, or Firm—John B. Sowell

[57] ABSTRACT

An optical projection viewing system of the type having a rotating lenticular screen mounted in an adjustable viewing housing is provided. The height of the front of the viewing housing is adjustable up and down to adjust to the proper eye level of the user. The optical path of the system is provided with structure which automatically changes the direction of the optical path to automatically adjust for height adjustment of the viewing housing.

25 Claims, 12 Drawing Figures

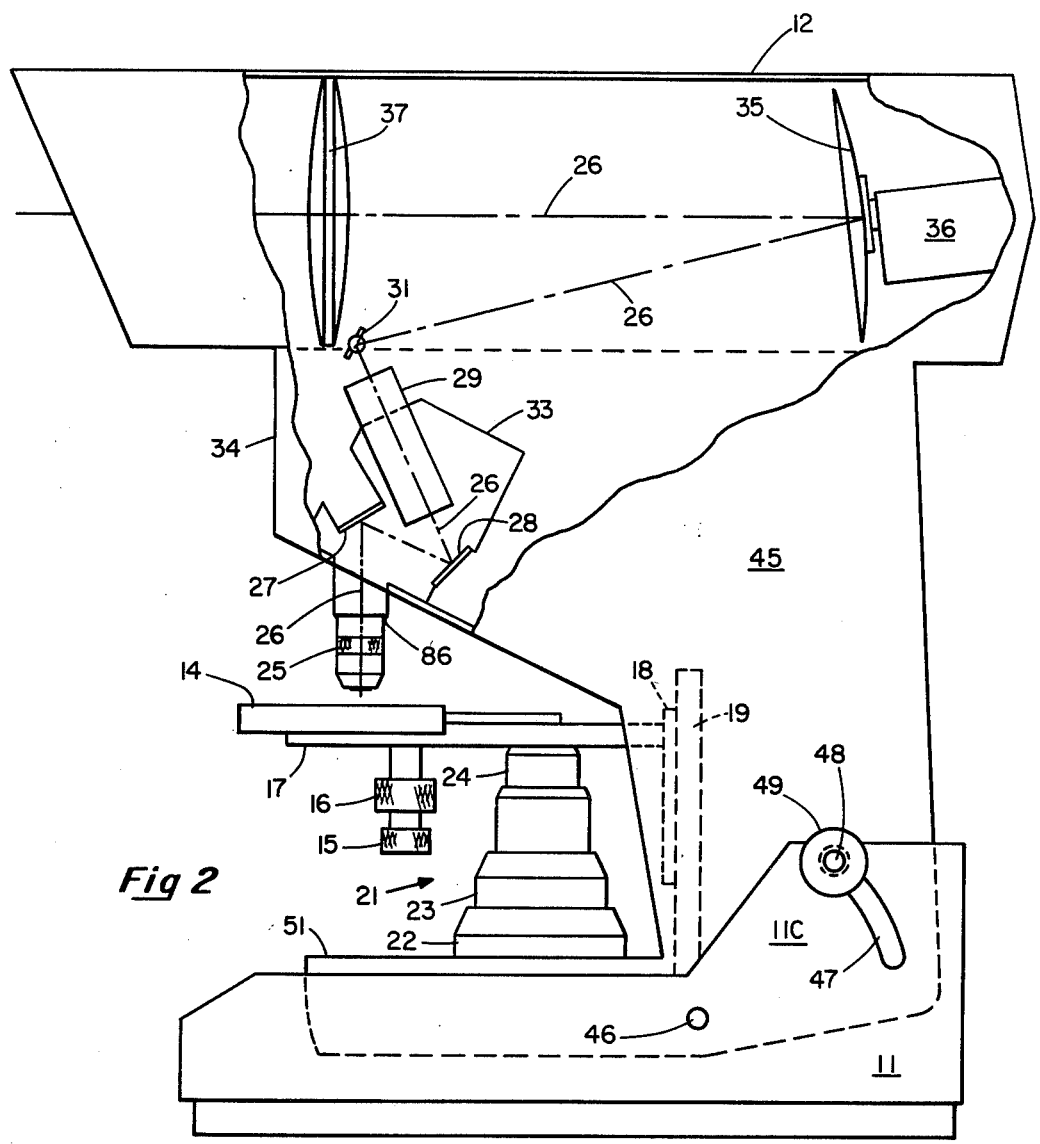
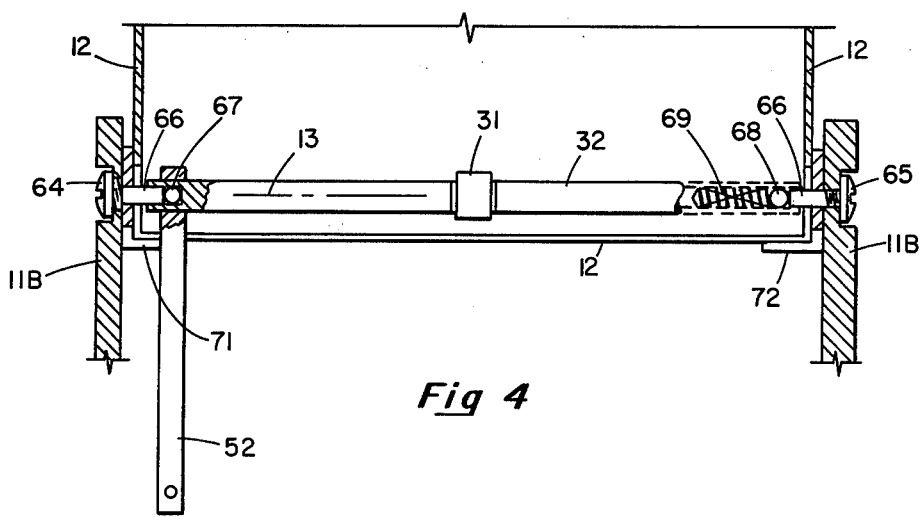

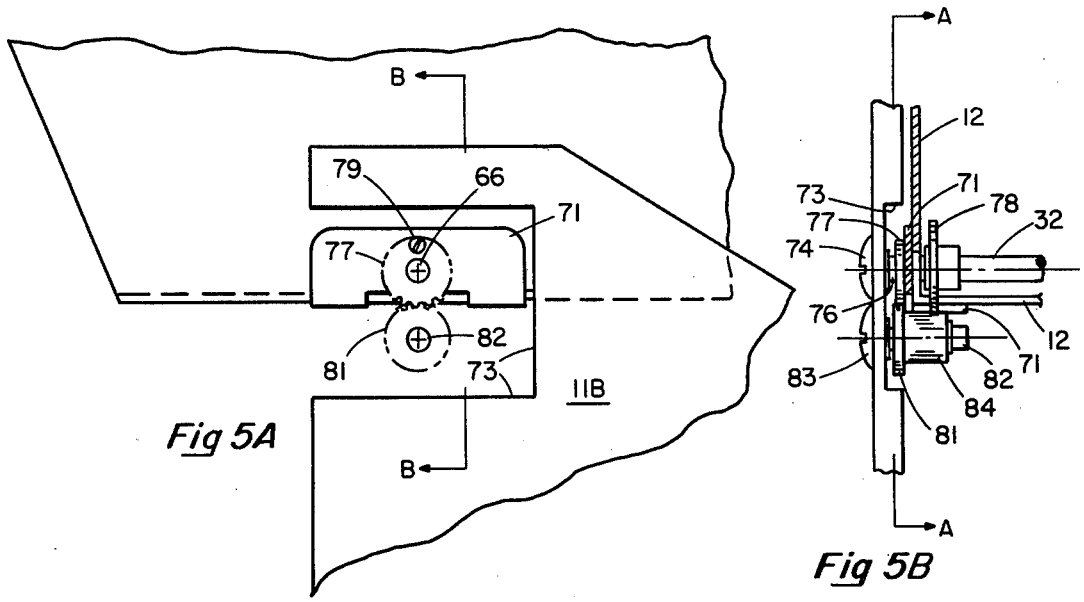
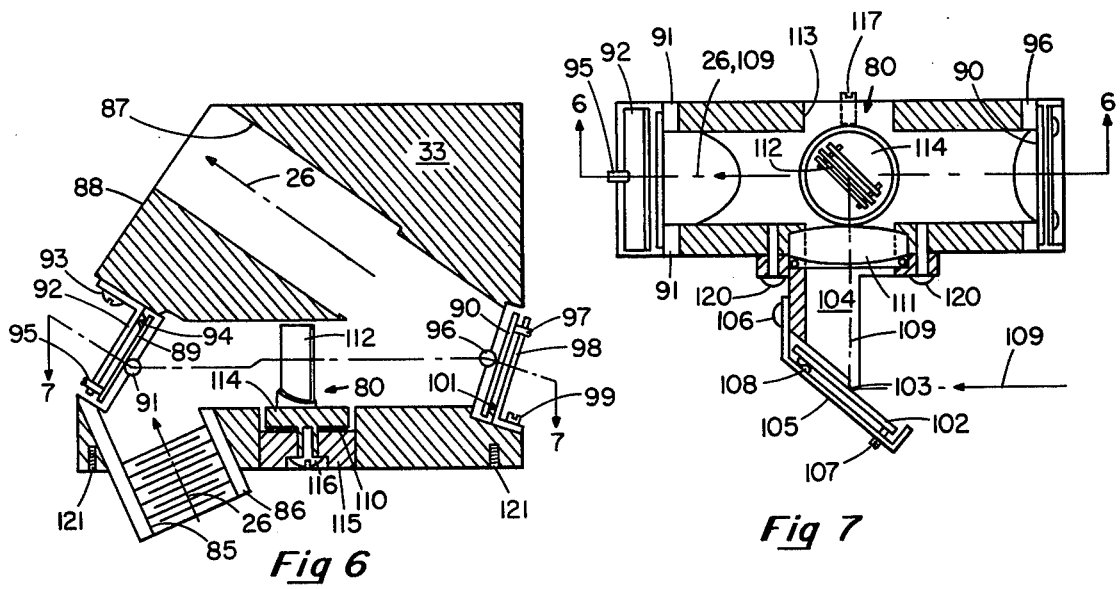

OPTICAL PROJECTION VIEWING SYSTEM

BACKGROUND OF THE INVENTION

1. Field of the Invention

This invention relates to a system for viewing an enlarged image on a screen. More particularly, the present invention discloses a new and improved viewing system which projects an enlarged image of a specimen or workpiece onto a moving lenticular screen where it can be viewed with a wide angle of vision.

2. Description of the Prior Art

Rotating screen optical projectors and systems for projecting enlarged images on screens are known. Rotating screen optical projection viewing systems, which are adapted to be mounted onto microscope stands in place of the ocular lens of a microscope, are also known.

Prior art rotating screen optical projection systems have required a long distance between the objective lens and the projection lens. To accomodate the substantially long distance between these lenses, the lenses are by necessity mounted separately and often require adjustment during manufacture and assembly and often require further adjustment when the objective lenses are being changed.

In order to accomodate a long optical path from the objective lens to the projection screen, the prior art systems have located the work station and/or the viewing screen at an undesirable distance from the person viewing the screen. Due to the requirement of a long optical path, some of the components and reflective surfaces required to bend the optical path are also located at undesirable positions within the prior art housings of the viewing system. In order to contain the prior art viewing screen in a compact housing, it was often necessary to place the viewing screen in the optical path at an angle which was tilted from the normal axis so great as to cause image distortion.

The prior art optical viewing systems often serve as a substitute for a microscope or a closed loop circuit television set used for viewing workpieces or specimens. When viewing a television screen, the operator or observer usually needs the workpiece at a convenient location for manual adjustment. The closed loop television screen is often located at a position which requires the observer to look to one side or the other of the workpiece and at an elevation which is not normal or restful. When the optical viewing system is placed on a microscope's stand in the prior art systems, the viewing screen location is dictated by the optical path of the system. Thus, the viewing screen has not been located at a comfortable or preferred restful position but has been located at an elevation predicted by the optical system and has not provided any adjustment for locating the viewing height.

Some of the prior art optical rotating screen projection viewing systems have not employed an optimum optical path and thus, have produced either bright reflected light spots or shadows on the viewing screen which causes the image to be illuminated nonuniformly.

Further, when the prior art optical viewing systems employed a rotating projection screen as an attachment to replace a microscope eyepiece, the amount of light that was usually available from the microscope light source to illuminate the workpiece or the specimen was spread over the large area of the projection screen which attenuated and reduced the brilliance of the image on the screen. Prior art optical projection viewing systems which employed rotating screens were vibration prone when adapted to be mounted onto a microscope designed to support eyepieces only. Vibration in such systems cause the image on the screen to be unstable.

It would be desirable to provide an optical projection viewing system which has a moving lenticular screen located at an optimum distance from the eye of the observer and having an adjustment which permits the angle of view of the screen to be adjusted to the eye height of the observer. Further, it would be desirable to provide a more compact and stable optical projection viewing system which permits the operator to make X, Y and Z adjustments manually with a single hand.

SUMMARY OF THE INVENTION

It is a principal object of the present invention to provide an optical projection viewing system having a tilting viewing head with means for automatic adjustment of the optical path to maintain the image on the center of the viewing screen.

It is another principal object of the present invention to provide an optical projection viewing system having the viewing lens located opposite the eyes of the viewer and having the workstation controls at an optimum location for comfort of operation of the operator.

It is another principal object of the present invention to provide in an optical projection viewing system an optical mounting block on which the critical adjustable optical components are precisely and rigidly located with respect to each other.

It is another object of the present invention to provide in an optical projection viewing system an optically reflective surface located in a portion of the optical path between the viewing screen and the projection lens where the light bundle has been converged to a small spot.

It is yet another object of the present invention to provide in an optical projection viewing system having a pivoting viewing screen housing containing a viewing screen, means for automatically adjusting the optical path to compensate for movement of the viewing screen.

It is another object of the present invention to provide in an optical projection viewing system a plurality of X-Y and Z controls near the work station and in the close proximity to each other to permit manual simultaneous operation of the controls with one hand.

It is another object of the present invention to provide in an optical projection viewing system a fine and coarse vertical Z adjustment control having flywheel action for rapid adjustment.

It is yet another object of the present invention to provide in an optical projection viewing system a smooth free action tilting viewing head having a tilt angle control.

It is another general object of the present invention to provide in an optical projection viewing system an optical mounting block which is easily accessible from the front of the viewing system to permit cleaning, adjustment of elements and/or exchange of the projection lenses.

According to these and other objects of the present invention there is provided in an optical projection viewing system a fixed base having a vertical extending stand which is adapted to receive and support a pivoting viewing housing. A viewing screen is mounted in the viewing housing and is adapted to be pivoted to provide height adjustment to the eye level of the person viewing the image on the screen. The viewing system is provided with light bending means which comprise a plurality of reflective surfaces. One of said reflective surfaces is mounted on a pivot shaft for supporting and pivoting said reflective surface and drive means are coupled to said pivot shaft and to said viewing housing to provide automatic adjustment of said reflective surface to maintain the optical path in the center of the viewing screen.

BRIEF DESCRIPTION OF THE DRAWINGS

FIG. 2 is a right side elevation in partial section showing a modified embodiment viewing housing pivotally mounted at the base;

FIG. 4 is an enlarged elevation in partial section taken through the viewing housing at lines 4—4 of FIG. 3A showing the pivot shaft mounted on the upper base or stand;

FIGS. 5A and 5B are enlarged partial right side elevations in section showing the pivot shaft and a modified means for automatically adjusting the optically reflective surface;

FIG. 6 is an enlarged section in elevation of the optical mounting block taken at lines 6—6 of FIG. 7;

FIG. 7 is an enlarged section in elevation of the optical mounting block taken at lines 7—7 of FIG. 6;

DESCRIPTION OF THE PREFERRED EMBODIMENT

Figure 1:
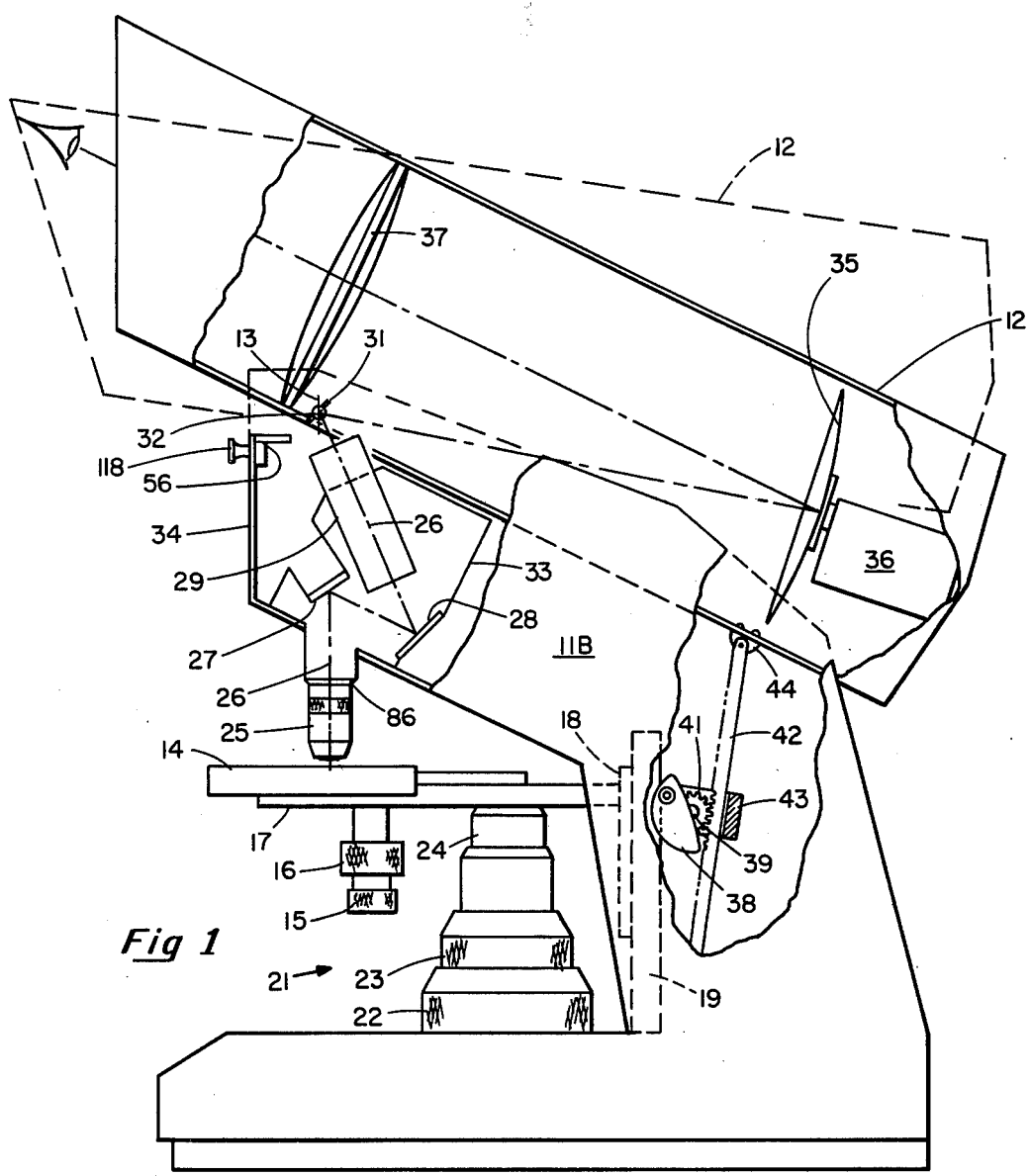
FIG. 1 is a right side elevation in partial section showing a preferred embodiment viewing housing pivotally mounted on a base which supports an adjustable work station.

Refer now to FIG. 1 showing the preferred embodiment optical projection viewing system 10. The base 11 comprises a lower base 11A or support and an upper base 11B or stand which supports the viewing housing 12. Viewing housing 12 is preferably rectangular in cross-section and fits between the bifurcated upper extensions of stand 11B. Viewing housing 12 is pivoted on pivot axis 13 which is mounted at its ends on stand 11B as will be explained in greater detail hereinafter. An object or specimen to be viewed is placed on work station 14 which adjusts in the X and Y axis by means of an X motion control wheel 15 and a Y motion control wheel 16 which are coaxially mounted. Such X and Y adjustable work stations are commercially available and do not require a detailed description herein.

The X-Y motion work station is mounted on the Z motion platen 17 which is fixed to a vertical slider 18. Vertical slider 18 is movably mounted in a pair of vertical guides 19 attached to the inside of stand 11B. Z adjustment means 21 comprises a course adjustment wheel 22 and co-axially mounted fine adjustment wheel 23. Z adjustment means 21 are fixed to base 11 as will be explained in greater detail. The upper extendable portion 24 of Z adjustment means 21 is fixed to platen 17.

An object or specimen (not shown) placed on work station 14 opposite objective lens 25 may be viewed by a person looking through the viewing lens of viewing housing 12. The optical path 26 starts at the work station 14 and is enlarged through the objective lens 25 to a point where it is bent or reflected off of a front surface mirror 27. The enlarged light bundle is projected onto a second front surface mirror 28 where it is bent or reflected toward the projection lens 29. Projection lens 29 collects and converges the light bundle toward the light bending means 31 which consist of a front surface mirror having its front surface located in the same plane as the pivot axis of pivot shaft 32. In the preferred embodiment viewing system, objective lens 25, projection lens 29 and front surface mirrors 27, 29 are mounted on an optical mounting block 33 which can be removed via removable panel 34 on the front of the upper base 11B. The details of the optical mounting block 33 will be explained in greater detail hereinafter.

In the preferred embodiment viewing system, the light bundle is converged toward mirror 31 so that it forms a small spot on mirror 31 where it is bent or reflected as a diverging bundle of light onto concave-shaped lenticular screen 35. In the viewing system shown, lenticular screen 35 is preferably rotated by means of a drive motor 36 to provide a smooth gain-free image on screen 35. The real projected image on screen 35 is viewed through magnifying viewing lens 37 which creates a virtual image of the real image on screen 35. The magnifying viewing lens 37 creates a virtual image intermediate lens 37 and screen 35 which appears to be larger than the real image and at a greater distance from the observer than the real image.

Housing 12 is pivotally mounted on upper base 11B on the same axis as pivot shaft 32. When housing 12 is pivoted to the position shown by phantom lines 12, the optical path 26 which is projected onto mirror 31 must be bent or reflected upward so that it is centered on screen 35 which also moves. Pivot shaft 32 is provided with means for automatically adjusting the angle of mirror 31 when viewing housing 12 is moved to provide proper height adjustment for a person viewing screen 35 through viewing lens 37.

Knob 38 is fixed to a shaft 39 which passes through base 11B. A pinion gear 41 on shaft 39 engages a rack 42 which is held engaged by keeper 43. Rack 42 is pivotally mounted to housing 12 at pivot block 44. The rear end of housing 12 may be moved vertically up or down employing the knob 38 so that proper height adjustment of the front of viewing housing 12 is provided. In the preferred embodiment viewing system, an angle of tilt from horizontal to twenty-five degrees of depression will provide an actual height adjustment of several inches. Most microscopes and projection viewing systems have no means of adjusting the image to the comfort range of the viewer and produce stress as well as eye fatigue when used for only a short time.

Refer now to FIG. 2 showing a modified embodiment tilt adjustment means. Base 11 is provided with an upward extending projection 11C. The lower extension 45 of housing 12 is pivoted on pivot shaft 46 in base 11. The upper extension 11C of base 11 is provided with an arcuate slot 47. Threaded stud 48 on housing extension 45 passes through slot 47. Knurled hand knob 49 is screwed onto stud 48 to clamp and hold housing 12 and housing extension 45 in a preferred selected angle of tilt. The housing 12 is shown in its lowest or horizontal position and may be elevated by tilting the front of housing 12 up and clamping the housing extension 45 at a desired height position.

The vertical guides 19 are mounted on housing extension 45 so that the slider 18, platen 17 and work station 14 with control wheels 15 and 16 all tilt with housing 12. The Z adjustment means 21 is connected intermediate platen 17 and Z adjustment support 51 which is connected to housing extension 45. The modified embodiment shown in FIG. 2 does not require that light bending means 31 be adjustably mounted on a pivot shaft 32 because optical path 26 does not change when housing 12 is tilted. All of the lenses and optical reflecting surfaces are the same as those shown in FIG. 1 and do not require further explanation.

Figure 3A:
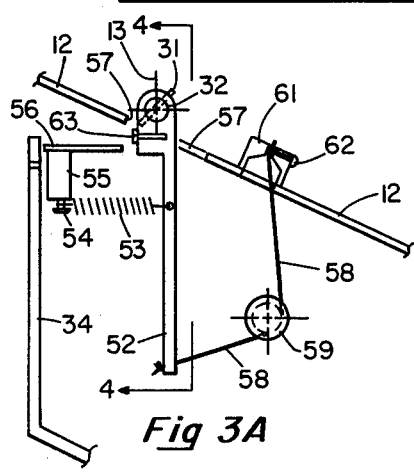
FIGS. 3A and 3B are enlarged partial right side elevations in section showing the pivot shaft and the optically reflective surface mounted thereon and means for automatically adjusting the optically reflective surface.
Figure 3B:
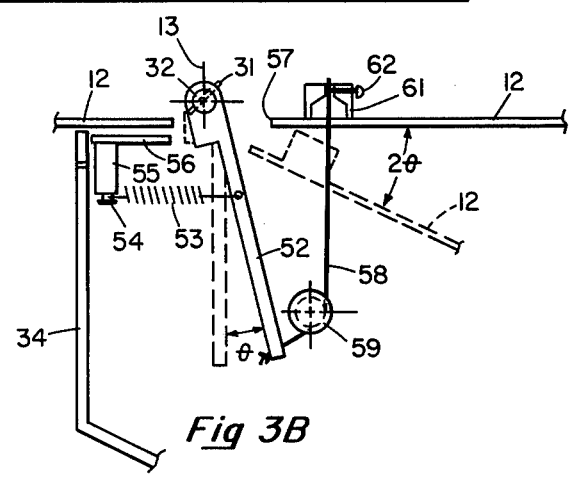

Refer to FIGS. 3A and 3B showing the means for automatically adjusting light bending means 31. FIG. 3A is an enlarged detail which is taken at a point just inside of the vertical side of housing 12. The pivot shaft 32 is shown supporting the light bending means 31 so that the front surface mirror has its surface plane passing through the center of rotation of pivot shaft 32. Lever 52 is shown in a substantially vertical position when the housing 12 is adjusted to its intermediate height adjustment position. Lever 52 is biased by spring 53 which is attached to anchor screw 54 on support member 55. Support member 55 is supported by the two sides 11B of the upper base. A cover plate 56 is attached to the upper surface of support member 55. A slot or opening 57 in the bottom of housing 12 provides room for lever 52 to move without engaging the housing 12. A flexible cable 58 is attached to the lower end of lever 52 and passes over pulley 59. The other end of flexible cable 58 is attached to a cable anchor 61 which is mounted on the bottom of the housing 12. A clamp screw 62 is provided for holding flexible cable 58 in cable anchor 61. After the optical bending means 31 is set in its approximate position and the flexible cable 58 is attached as shown in FIG. 3A, a final adjustment is made by projecting an optical path of light 26 onto light bending means 31. The clamp screw 63 is then loosened and the pivot shaft 32 is rotated so that the optical path is projected into the exact center of the screen 35 and is then re-tightened while the housing 12 is located at its intermediate height position. Since the distance from the center of rotation of pivot shaft 32 to the center of cable anchor 61 is only one half the length of the distance from the center of rotation of pivot shaft 32 to the point of attachment of flexible cable 58 on lever 32, the light bending means 31 will stay in perfect alignment. When the cable anchor 61 is moved through an angle of two degrees in a counterclockwise direction, the lever 52 will be moved through an angle of only one degree. This will cause the optical path 26 to always be centered in the center of screen 35.

Refer now to FIG. 3B showing the housing 12 located in a hozizontal position. The cable anchor has moved through an angle of two theta which has caused the lever 52 to move through an angle of theta. It will be understood that the lever 52 can move to either side of the vertical position to offer proper tracking for height adjustment of housing 12.

Refer now to FIG. 4 which is a partial section in elevation taken at lines 4—4 of FIG. 3A. The light bending means 31, which comprises a front surface mirror, is mounted in a recess in pivot shaft 32. The front reflective surface of mirror 31 is located so that the pivot axis 13 of shaft 32 is in the front plane of the reflective surface. Lever 52 is clamped to shaft 32 for adjusting the angle of light bending means 31. Pivot screws 64 and 65 are mounted on the sides of upper base 11B and are provided with cylindrical extensions 66 which fit into cylindrical recesses in the ends of pivot shaft 32. Ball 67 engages the end of screw 64 and a ball 68 is biased by spring 69 to engage screw 65.

Angle shaped support members 71 and 72 also pivot on cylindrical extensions 66 and provide support for viewing housing 12. It will be understood that when housing 12 is pivoted on cylinder screws 66 that the automatic adjustment of mirror 31 on shaft 32 is automatically made at a proper rate of angular movement to maintain the image centered on screen 35.

Refer now to FIGS. 5A and 5B showing a modified structure for adjusting pivot shaft 32 employing pivoted couplings or gears. The upper base or stand 11B has a rectangular recess 73 cut into the right side only. Screw 74 is provided with a cylindrical extension 76 for supporting gear 77 and shaft 32 thereon. Gear 78 is fixed to shaft 32. Gear 77 is fixed to channel shaped support member 71 by screw 79 and is rotated with viewing housing 12 as it pivots on cylindrical extension 76 which causes gear 81 on cylindrical extension 82 of screw 83 to turn. Gears 77 and 81 are the same size gears. Gear 81 is rotated counterclockwise when housing 12 rotates gear 71 clockwise. Gear 84 is fixed to gear 81 and is half the diameter of mating gear 78, thus, gear 78 is rotated at half the effective angular rotation movement of gears 77, 84 and 81. It will now be understood that shaft 32 is rotated at half the angular movement of housing 12 and in the same direction of rotational movement as housing 12.

Refer now to FIGS. 6 and 7 showing details of the optical mounting block 33 shown in FIGS. 1 and 2. A threaded recess 85 is adapted to receive an objective lens. The shoulder 86 is provided as a precision stop to assure that the objective lens is properly located on block 33. A cylindrical recess 87 is adapted to receive a projection lens. The surface 88 is provided as a precision stop to assure that the projection lens is properly located on block 33.

Since the recess 87 is accessible through panel 34 at the front of system 10, projection lenses 25 may be easily changed. The optical path 26 is shown reflecting off of the front surface of mirror 89 and proceeds through a beam splitter 80. The optical path is bent or reflected off of the front surface of mirror 90 and is directed out through recess 87. Mirrors 89 and 90 are adjustably mounted on block 33. Mirror 89 pivots on two cylindrical pins 91 seated in recesses in block 33 at opposite sides of the mirror and out of the way of the light path. Angular shaped keeper 92 is mounted on block 33 by screws 93. Wave spring 94 engages the back of mirror 89 and keeper 92. Set screw 95 is threaded through angular shaped keeper 92 and provides means for tilting mirror 89, thereby adjusting the optical path 26. Similarly, mirror 90 pivots on pins 96 and is adjusted by set screw 97 in keeper 98. Keeper 98 is mounted on block 33 by screws 99 with wave spring 101 pressed against the back of mirror 92.

Block 33 has mounted on one side a front surface mirror 102 which presses against an upper finger (not shown) and a lower finger 103 or semicircular shaped holder 104. A channel shaped keeper 105 is mounted on holder 104 by screw 106. Set screw 107 and wave spring 108 adjustably urge mirror 102 into engagement with fingers 103 of holder 104. A light beam 109 is provided from a light source (not shown). The light beam 109 is reflected by mirror 102 through converging lens 111 onto the beam splitting transparent-reflective surface 112. In the preferred embodiment beam splitter 80, approximately half of the light passes through aperture 113 and the other half is reflected into the optical path 26 directed toward mirror 89 and the objective lens 25 where it provides frontal lighting on the object or specimen on the work station 14. The light bundle returning along the optical path 26 must pass through the beam splitting surface 112, thus, about fifty percent of the image illumination light is reflected out of the optical path and loss.

Beam splitters are well known. The transparent-reflective beam splitter surface 112 of beam splitter 80 is mounted on a cylindrical shaped holder 114 which is seated on wave washer 110. Holder 114 is fastened to disk 115 by screw 116. Screw 116 is rotated to adjust surface 112. Disk 115 is locked in place by set screw 117. Mirror 102 is adapted to direct the light beam 109 to the beam splitter surface 112. Holder 104 is mounted on the side of block 33 by screws 120 and urges the O-ring into engagement with converging lens 111.

Figure 8:
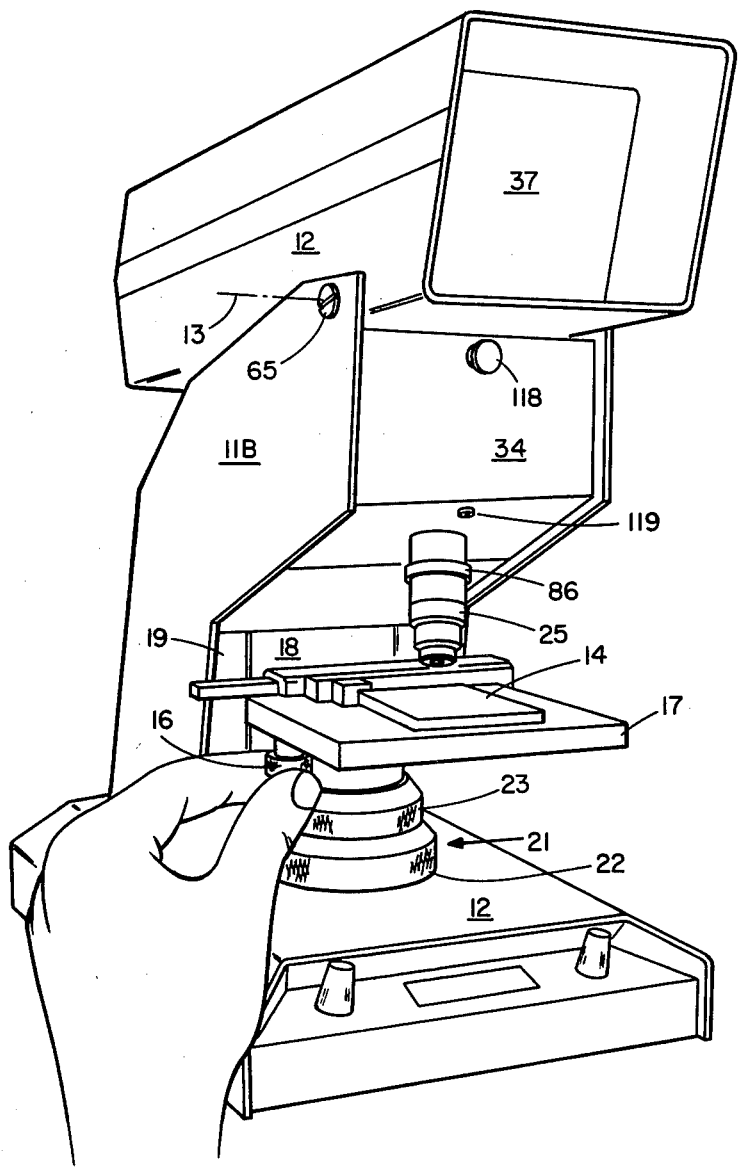
FIG. 8 is an isometric view of the front of the viewing system showing the work station and means for making X-Y and Z adjustments.

Refer now to FIG. 8 showing in a front isometric view the relative position of the X, Y and Z motion controls. The Z adjustment means 21 telescopes or elongates to position platen 17 (not shown) in the vertical or Z axis. Work station 14 mounted on platen 17 is adjustable in the X direction by control wheel 15 and in the Y direction by control wheel 16. The X and Y controls can be operated by the thumb and index finger leaving the middle, ring and little fingers to operate the Z motion adjustment wheels 22 and 23. In the preferred embodiment shown in FIGS. 1 and 8, the Z adjustment means are located at a position where the hand and arm would be comfortably positioned. The height of the viewing lens 37 in the front of the housing 12 is located opposite the eye level of a seated operator when the system is table mounted. The height of the viewing lens 37 may be adjusted by tilting the housing 12 on the pivot axis 13 of screws 65, 64.

The front panel 34 is L-shaped and held in place by a rear pivot (not shown) and a thumb screw 118 which screws into support member 55. Block 33 is mounted on the inside of front panel 34 with shoulder 86 and threaded recess 85 extending through a hold in the panel 34. Two screws 119 extend through panel 34 and thread into recesses 121 of block 33 to fasten the optical mounting block 33 thereto. Panel 34 is designed to permit access to the elements shown FIGS. 3 to 6 to permit changing the projection lens 26 or adjustments of the light bending mirrors.

Figure 9:
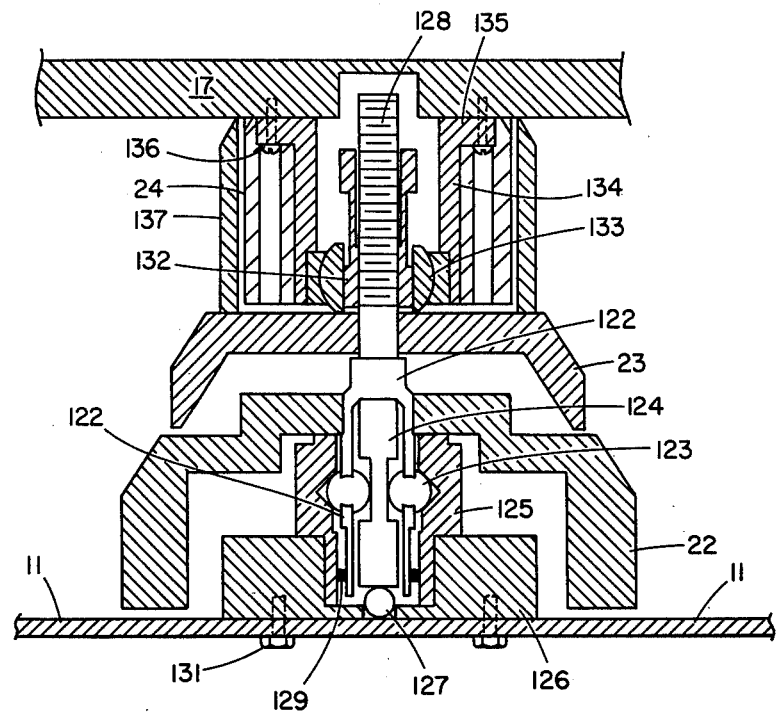
FIG. 9 is an enlarged section in elevation taken through a course and fine Z adjustment means.

Refer now to FIG. 9 showing details of construction of the novel Z adjustment means 21. As explained hereinbefore control wheel 22 is for course or rapid Z movement and control wheel 23 is for fine or slow Z movement. Movement of wheel 22 rotates ball cage 122. Balls 123 in recesses of the ball cage 122 are urged into engagement with minor shaft 124 and are maintained in engagement therewith, by outer compression race 125. Race 125 is fixed in support ring 126. Thrust ball 127 supports the end of Z-shaft 128 which is not connected to ball cage 122. Rotation of wheel 22 rotates balls 123 which engage minor shaft 124 and rotate Z-shaft 128 with an increase of rotational movement of approximately eight to one. Balls 123 act as planatary rollers to achieve the increase in rotational advantage. Sleeve bearing 129 between ball cage 122 and compression race 125 provides means for centering the ball cage 122 relative to race 125. Screws 131 secure support ring 126 to base 111.

Fine control wheel 22 is connected directly to Z-shaft 128, and when rotated cause threaded nut 132 fitted in ball joint 133 to move vertically. The outer race of ball joint 133 is fitted into cylindrical collar 134. Upper flange 135 of collar 134 is attached to platen 17. Rotational movement of wheel 23 will rotate Z-shaft 128 causing the nut 132, ball joint 133 and collar 134 to move platen 17 vertically. Platen 17 supports the work station 14. A cylindrical sleeve 24 may be attached to flange 135 by screws 136 to form a protective extendable portion 24 of sleeve 137 which is fixed on control wheel 23.

Other forms of Z adjustment means may be employed, however, the present embodiment Z adjustment means 21 may be freely rotated by finger tip strokes while operating the X and Y motion control wheels 15 and 16.

Figure 10:
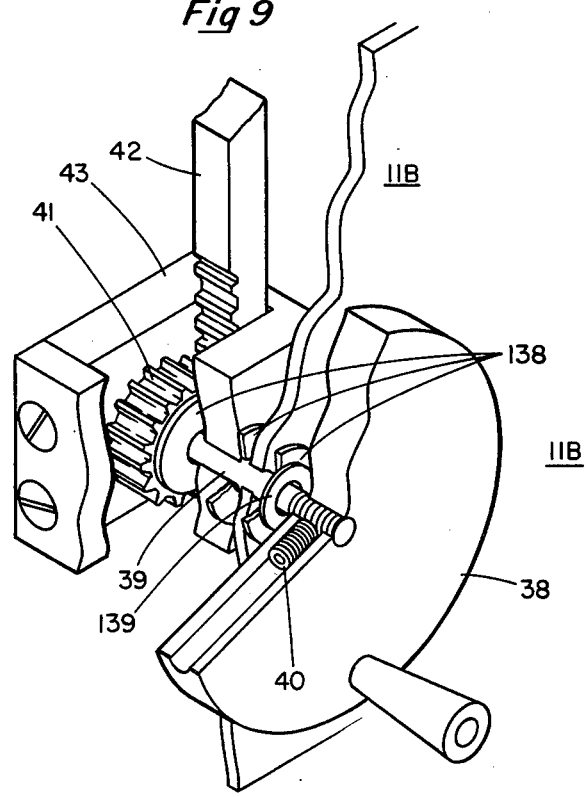
FIG. 10 is an enlarged partial isometric view of the tilt adjustment means shown in FIG. 1.

Having explained a preferred embodiment Z adjustment control means 21, refer now to FIG. 10 which shows in detail the preferred embodiment tilt control means for housing 12 illustrated in FIG. 1. Hand knob 38 is fixed by set screw 40 to shaft 39. Friction washer 138 and tension washer 139 are spaced between knob 38 and the upper base or stand 11B on shaft 39. Friction washer 138 is spaced between stand 11B and keeper 43. Keeper 43 forms an open rectangular cage for pinion gear 41 and rack 42. Keeper 43 is free to rotate on shaft 39 to permit rack 42 to swing in an arcuate path as it pivots on pivot block 44 connected to housing 12. In the preferred embodiment tilt control means, the hand knob 38 is screwed onto shaft 39 to compress friction washers 138 and tension washer 139 against the wall of upper base 11B. Housing 12 will remain in a set position when sufficient friction force is provided. Set screw 40 is then employed to lock knob 38 to shaft 39 so that the friction force does not change.

In the preferred embodiment system 10 shown in FIG. 1, the viewing housing 12 is raised or lowered to provide height adjustment. The front of the housing 12 is pivoted, however, the rear of the housing could be pivoted to accomplish the same result. It is possible to move the front or rear of the housing without moving or tilting the viewing screen 35.

When the housing 12 is tilted, it is preferable to provide means for automatically changing the optical path 26 so that the image projected on the viewing screen 35 remains centered on the viewing screen. In the FIG. 2 embodiment, it was shown how the housing 12 and housing extension 45 could be mounted on the base 11 so that the housing 12 could be pivoted to provide height adjustment.

In the preferred embodiment, the light bending means 31 is placed in the optical path at a point where the light beam bundle is substantially reduced to a small spot. It is possible to place adjustable tilt compensating mirrors at any location in the optical path 26 to adjust for viewing height compensation.

For example, even though it is preferable to automatically adjust a small mirror placed opposite the projection lens to direct the image onto the center of the screen 35, it is possible to locate large adjustable mirrors between the viewing screen 35 and the operator to achieve an equivalent result.

It is also possible to place tilt compensating adjustment mirrors between the objective lens and the projection lens to achieve comperable results.

Persons skilled in this art will understand that the lenticular viewing screen can be made flat if a field lens is interposed in front of the flat lenticular screen. Further, if the magnification afforded by the viewing lens is not desired or needed, then the magnification lens 37 may be omitted.

I claim:

1. An optical projection viewing system comprising:
   a fixed base,
   an object supporting work station,
   a viewing housing,
   a viewing screen fixed in said housing for displaying a projected image thereon,
   said viewing housing being mounted for pivotal movement relative to said base on pivot means remote from said viewing screen to provide vertical arcuate displacement of said viewing screen and height adjustment for a person viewing said screen,
   an optical system comprising a projection lens and an objective lens mounted intermediate said viewing screen and said work station,
   light bending means pivotally mounted on a fixed axis at a fixed distance from said viewing screen and said objective lens,
   said light bending means further comprising adjusting means for maintaining the optical path of said viewing system relatively unchanged with respect to said viewing housing, and
   said pivot means being remote from said viewing screen and intermediate said base and said viewing housing for pivoting said viewing housing to provide said vertical height adjustment of said viewing screen.

2. An optical projection viewing system as set forth in claim 1 wherein said light bending means comprises a reflective surface,
   said reflective surface being mounted on a pivot shaft at said fixed point for supporting and pivoting said reflective surface, and
   said pivot shaft being mounted on said pivot means.

3. An optical projection viewing system as set forth in claim 2 wherein said adjusting means is coupled to said pivot shaft on said pivot means and comprises a fixed lever on said pivot shaft and a flexible coupling intermediate said lever and said viewing housing.

4. An optical projection viewing system as set forth in claim 2 wherein said adjusting means is coupled to said pivot shaft on said pivot means and comprises a rigid gear fixed on said pivot shaft and a plurality of pivoted gears connecting said rigid gear for said viewing housing and said base.

5. An optical projection viewing system as set forth in claim 1 which further includes tilt adjusting means coupled intermediate said pivotable viewing housing and said base for vertically adjusting the height of said viewing housing.

6. An optical projection viewing system as set forth in claim 1 wherein said optical system comprises an optical element block fixed relative to said base,
   said optical element block having lens mounting surfaces for accurately positioning said lenses relative to each other.

7. An optical projection viewing system as set forth in claim 6 wherein said optical element mounting block is mounted on a removable panel at the front of said base to permit ease of removal of said mounting block.

8. An optical projection viewing system as set forth in claim 1 wherein said optical system comprises an optical element mounting block fixed relative to said base,
   said mounting block having a lens mounting surface and a plurality of surfaces for mounting light direction changing means.

9. An optical projection viewing system as set forth in claim 8 wherein said light direction changing means are pivotably mounted on said optical element mounting block, and
   adjustment means mounted on said mounting block cooperating with said light direction changing means for adjusting said optical path.

10. An optical projection viewing system as set forth in claim 8 wherein said optical element mounting block further comprises means for mounting a beam splitter for directing a beam of light into said optical path which passes through said objective lens.

11. An optical projection viewing system as set forth in claim 1 wherein said work station is supported on said base opposite said objective lens,
    Z adjustment means,
    said work station comprising an X-Y stage having X and Y adjustment controls mounted in close proximity to said Z adjustment means, whereby a plurality of X-Y and Z adjustments may be made simultaneously with one hand.

12. An optical projection viewing system as set forth in claim 11 wherein said Z adjustment means further comprises a Z fine adjustment wheel and a Z coarse adjustment wheel coaxially mounted.

13. An optical projection viewing system as set forth in claim 1 wherein said light bending means comprises an optically reflective surface located in a portion of said optical path where the light bundle is being converged, and
    wherein said optically reflective surface is substantially out of said viewing path between the viewing screen and the person viewing the screen.

14. An optical projection viewing system as set forth in claim 13 wherein said light bundle is converging toward said optically reflective surface to provide a small spot at the point where said optical path is bent.

15. An optical projection viewing system as set forth in claim 14 wherein the image projected on said viewing screen is substantially uniform when projected from said small spot from said light bending means.

16. An optical projection viewing system comprising:
    a fixed base,
    a stand connected to said base,
    an object supporting work station,
    a viewing housing mounted for pivotal movement relative to said stand,
    a viewing screen mounted in said viewing housing to be moved with said viewing housing to provide vertical arcuate displacement of said viewing screen and height adjustment to a person viewing said screen,
    pivot means remote from said viewing screen for mounting said viewing housing on said stand,
    an optical system comprising a projection lens and an objective lens intermediate said viewing screen and said work station,
    light bending means pivotally mounted on a fixed axis at a fixed distance from said viewing screen and said objective lens for maintaining the optical path of said optical system relatively unchanged with respect to said viewing housing, an optical element mounting block mounted on said stand, said mounting block having a lens mounting surface and a plurality of surfaces for mounting light direction changing means, said light bending means further comprising adjusting means coupled to said stand and said viewing housing for pivoting said light bending means, and light direction changing means mounted on said mounting block.

17. An optical projection viewing system as set forth in claim 16 which further includes, means for adjusting said light direction changing means on said optical elements mounting block.

18. An optical projection viewing system as set forth in claim 16 wherein said light bending means comprises a reflective surface, said reflective surface being mounted on a pivot shaft for supporting and pivoting said reflective surface, and said pivot shaft being mounted on said pivot means.

19. An optical projection viewing system as set forth in claim 18 wherein said drive means is coupled to said pivot shaft on said pivot means and comprises, a fixed lever on said pivot shaft and a flexible coupling intermediate said lever and said viewing housing.

20. An optical projection viewing system as set forth in claim 18 wherein said drive means is coupled to said pivot shaft on said pivot means and comprises a rigid gear fixed on said pivot shaft and a plurality of pivoted gears connecting said rigid gear to said viewing housing and said base.

21. An optical projection viewing system as set forth in claim 16 wherein said work station is supported on said base opposite said objective lens, Z adjustment means, said work station comprising an X-Y stage having X and Y adjustment controls mounted in close proximity to said Z adjustment means, whereby a plurality of X-Y and Z adjustments may be made simultaneously with one hand.

22. An optical projection viewing system as set forth in claim 21 wherein said X and Y adjustment controls comprise adjustment controls coaxially mounted.

23. An optical projection viewing system as set forth in claim 21 wherein said Z adjustment means further comprises a Z fine adjustment wheel and a Z coarse adjustment wheel coaxially mounted.

24. An optical projection viewing system as set forth in claim 16 wherein said work station is supported on said base opposite said objective lens, said work station comprising an X-Y stage having X and Y adjustment controls, and Z adjustment means intermediate said X-Y adjustment controls and said base.

25. An optical projection viewing system comprising:

a fixed base, an object supporting work station, a viewing housing, a viewing screen in said viewing housing, a magnifying viewing lens in said viewing housing for viewing an image on said viewing screen, said viewing housing being mounted on said base to provide vertical viewing height adjustment to a person viewing said viewing screen, an optical system comprising a projection lens and an objective lens intermediate said reflective screen and said work station, and light bending means for changing and maintaining the optical path of said viewing system on said viewing screen without changing the length of the optical path when said viewing housing is moved vertically relative to said base to provide vertical viewing height adjustment for a person viewing said viewing screen.

* * * * *